United States Patent Office 3,666,519
Patented May 30, 1972

3,666,519
POLYOLEFIN SUBSTRATE DECORATED WITH A HEAT FUSED POLYESTER-ALKYD RESIN PRINTING INK
John W. Bayer, Toledo, Ohio, assignor to
Owens-Illinois, Inc.
No Drawing. Application June 25, 1968, Ser. No. 739,610, now Patent No. 3,557,691, dated Jan. 26, 1971, which is a continuation-in-part of application Ser. No. 393,049, Sept. 8, 1964. Divided and this application July 9, 1970, Ser. No. 53,626
Int. Cl. G03g 13/22, 13/08
U.S. Cl. 117—17.5
4 Claims

ABSTRACT OF THE DISCLOSURE

There is disclosed an article of manufacture decorated with an electrostatic printing ink composition consisting essentially of a free-flowing, heat fusible polyester-alkyd resin powder prepared by reacting a difunctional, aliphatic, hydroxy compound, e.g. a glycol, and a dicarboxylic acid or anhydride in the presence of a drying oil acid, e.g. a vegetable oil fatty acid.

RELATED CASES

This application is a division of U.S. patent application Ser. No. 739,610, filed June 25, 1968 and now U.S. Pat. No. 3,557,691; said application Ser. No. 739,610 being a continuation-in-part of my copending U.S. patent application Ser. No. 393,049, filed Sept. 8, 1964, now abandoned.

This invention relates to printing inks that are employed for the electrostatic stencil printing on various surfaces. More particularly, this invention relates to heat fusible, free-flowing, finely divided polyester resin printing inks that are used for decorating various surfaces including plastics such as polyethylene containers and other polyethylene surfaces according to electrostatic stencil printing techniques.

Various methods have been employed in the past for printing on surfaces using a wide variety of different materials and methods. One of the methods is disclosed in U.S. Pat. No. 3,081,698. Other successful methods are in the use of systems of electrostatic stencil printing similar to that described in abandoned U.S. patent applications Ser. Nos. 242,229, now abandoned, and 323,409, now abandoned, respectively, filed Dec. 4, 1962 and Nov. 13, 1963 (owned by the assignee of this application), the full disclosures of which applications are incorporated herein by reference. The principles of operation involved in electrostatic printing are well developed in the art.

In an electrostatic stencil printing system representative of the art, there is provided an electrically charged conductive stencil wherein the printing areas comprise a fine mesh open screen and the non-printing areas are suitably masked. The substrate or surface being printed which may be a plastic film, paper sheet and the like may be backed by a conductive plate with an opposite charge relative to the charge of the printing stencil. A finely divided printing powder having a particle size capable of passing through the open areas of the stencil is applied to the face of the stencil opposite to the conductive backing plate. The printing ink powder takes on the charge of the stencil and by means of the relatively low voltage electrostatic forces established passes through the opening therein across an air gap and toward the oppositely charged plate. Because the surface desired to be printed is placed in the air gap between the two charged plates, the printing powder is intercepted and forms the image on the surface according to the open areas of the printing stencil. This arrangement and other arrangements are known and have been described in the past.

Heretofore, printing inks that have been employed for the electrostatic printing on polyolefin surfaces, such as in processes for decorating and labeling polyethylene containers, have not been altogether satisfactory. One particular difficulty encountered is the relatively high fusion point of the polymers and resins employed for such ink compositions. In applying the ink to the polyolefin surface, the ink is fused in order to obtain good adhesion to the substrate. However, it is necessary that the fusion temperature be below about 90° C. so that the blown polyethylene bottles and containers will not distort under the ink curing conditions. At the same time, the resin powder must remain in a free-flowing condition at room temperature and preferably remain free-flowing at temperatures above room temperature.

Another difficulty that has been encountered in the past using heat fusible resin ink compositions is in obtaining a fused image that is flexible enough to withstand normal bending and stresses in the surface and yet at the same time is durable enough to resist the abrasion which occurs in the normal operations and normal wear to which the decorated surfaces are subjected.

Still further difficulties involved in this field include control of the cold flow and tackiness of the ink vehicles such that obstruction of the image aperture of the screen, known as "fogging" of the screen employed in the printing process is prevented. In addition, it is desirable to eliminate or substantially reduce adhesion between the printed surfaces while in storage.

Accordingly, it is the object of the present invention to provide a printing ink composition for use in electrostatic printing that eliminates and avoids the disadvantages of previously employed methods and compositions.

It is a further object of the present invention to provide a heat fusible, free-flowing, printing ink composition that will be capable of printing images that have good flexibility and satisfactory abrasion resistance.

It is a further object of the present invention to provide a method for electrostatically decorating various surfaces in a manner so as to improve the flexability and abrasive resistance of the decorated surface.

It is a further object of the present invention to provide a method for decoratively printing polyolefin surfaces by electrostatic means and employing a heat fusible, free-flowing, synthetic polyester-alkyd resin printing ink which overcomes the disadvantages and drawbacks of previously employed printing inks used for this purpose.

In attaining the above objects, one feature of the present invention resides in the free-flowing, heat fusible polyester-alkyd resin powder that is employed for electrostatically decorating and printing on polyolefin surfaces.

Other objects, features and advantages of the present invention will become apparent from the detailed description thereof that follows.

It has now been discovered according to the present invention that good adhesion, flexibility and abrasion resistance of printed images on polyolefin surfaces can be obtained by electrostatically printing with a finely divided, free-flowing printing ink comprising a polyester-alkyd resin. The basic ingredients used in forming the polyester resin are a difunctional, aliphatic hydroxy compound, and a dicarboxylic acid or anhydride. The polyester resin is then modified into a polyester-alkyd resin by a drying oil acid.

Suitable among the difunctional hydroxy compounds are the glycols including dihydroxy aliphatic hydrocarbons of 2 to 6 carbon atoms. Specific examples include ethylene glycol, 1,2 propylene glycol, 1,3 propylene glycol, 1,4 butylene glycol, the pentanediols and the hexanediols. A further example is 1,4-cyclohexane-dimethanol. Mixtures of glycols can be employed as, for example, mixtures of propylene glycol and diethylene glycol.

Among the dicarboxylic acids and anhydrides that may be employed for the present invention are phthalic acid, phthalic anhydride, hexachloroendomethylene phthalic anhydride, maleic anhydride, maleic acid, adipic acid, azelaic acid, sebacic acid, succinic acid, fumaric acid and malic acid.

The polyester is prepared by reacting the hydroxy component, e.g. a glycol, and the dicarboxylic acid component in the presence of a drying oil acid. Suitable drying oil acids include the vegetable oil fatty acids such as those derived from linseed oil, tung oil, perilla oil, soyabean oil, oiticica, and castor oil. Dimeric acids which are usually vegetable oil fatty acid mixtures can also be used with particularly good results.

In making the polyester, the dicarboxylic acid and the hydroxy component are heated in the presence of the drying oil acid so as to yield the solid resins. Polyesters of phthalic and maleic anhydride and the above-mentioned glycols are usually reacted at 220° C. without adverse color effect. In a reaction that normally proceeds rapidly at elevated temperatures, it is desirable to reduce the temperature and thereby reduce the reaction rate to provide enough time for adequate control of the reaction.

The ratio of proportions of the ingredients of the resin can vary and will be determined in part by the particular ingredients chosen. In general, the following formula gives the relationship of the hydroxy compound (dihydric alcohol) to the dibasic (dicarboxylic) acid using a mono basic drying acid:

Dihydric alcohol—1 mole
Dibasic acid—1$n$/2 mole
Fatty acid—$n$ mole wherein $n$ is a mole of fatty acid used and generally is not greater than 2. For materials such as those employed in Example I hereinafter, the range of $n$ is about 0.025 mole to about 0.3 mole with the preferred range being from 0.1 to 0.2 mole.

The resulting polyester-alkyd resin is then compounded with colorants such an inorganic or organic pigments to produce the printing powders which will adhere to the selected surfaces such as polyolefins. The colorant is usually blended into the resin while the resin is still fluid, i.e. immediately after the resin cook. To obtain uniformity of the resulting product, thorough stirring is advisable. Most suitable equipment for this purpose is a grinding mill which should be cooled to prevent overheating and resulting coalescence of the ink. The milling is continued to produced a product with a desirable particle size range, preferably about 30 microns or less. Generally, inorganic pigments are preferred since they can be used in large amounts up to about 50% or more of the total solids content and hence are cheaper than using organic pigments. The resin is ground with the pigment at room temperature although the temperature can be varied. For example, at lower temperature the grinding can be employed to make the resin more brittle which will result in the resin fracturing more easily and thereby speeding the grinding operation. Pigments suitable for the invention are quite numerous and no criticality is attached to their selection for purposes of the present invention. Included are titanium dioxide, the lead pigments, the iron oxide pigments, cadmium sulfides, chromium oxides and the like. Inorganic pigments can be used in ratios from 5 to 50% by weight. Organic colorants can be used in the range of from 5 to 20% by weight. Organic colorants derived from natural and synthetic dyestuffs can be used for purposes of the present invention and include azo colors, nitroso colors, indanthrene colors, phthalocyanine pigments and the like.

Colorants which can be organic or inorganic are generally used for the purpose of producing an opaque image. However, it is to be understood that the colorants can include materials and pigments for producing transparent or translucent images. For example, a dyestuff in low concentrations of not over 1% by weight could be employed for this purpose.

The following examples serve to illustrate the present invention but are not considered limiting thereof in any way.

EXAMPLE I

A polyester resin was preparing using the following ingredients:

| Materials: | Molar ratio |
|---|---|
| Hexachloroendomethylene phthalic anhydride | 0.85 |
| Tung acid | 0.15 |
| Linseed acid | 0.15 |
| Propylene glycol | 1.0 |

In preparing the polyester resin, a three-neck reaction flask is employed together with a stirrer, a gas inlet tube and a distilling condenser. The reaction is carried out in a nitrogen atmosphere to prevent oxidation of the fatty acid. The glycol component was charged to the flask whereupon the acids were added in the order of the lowest melting first. The entire apparatus was assembled and the system purged by the inert gas atmosphere. Heating was applied slowly so as not to char the materials and increased gradually when all of the solids have been dissolved making agitation possible. When the temperature of the solution reached about 100° C. the gas inlet tube was extended below the surface of the liquid whereupon the gas rate was increased moderately. The heat was applied to the fractionating column in order to facilitate removal of water of esterification. The vapor temperature above the fractionating column must be controlled between about 100 and 105° C. to allow free passage of water vapor yet minimize the loss of glycol component.

The reaction was heated at 180° C. for about 3 hours and then vacuum was applied from a water aspirator for ½ hour at the same temperature to remove as much water as possible.

During the early stages of the reaction, some time will be required before sufficient vapor is built up to maintain this temperature. A certain amount of glycol is lost because of azeotropes which are formed with the water. Minimization of the loss is important; however, the main objective is to keep the losses contant in each batch so that the properties are reproduced consistently.

EXAMPLE II

The following components in the indicated amounts were employed in the manufacture of a polyester-alkyd resin according to the method defined in Example I.

| Materials: | Molar ratios |
|---|---|
| Maleic anhydride | 0.80 |
| Hexachloroendomethylene phthalic anhydride | 0.20 |
| Propylene glycol | 1.0 |
| Tung acid | 0.15 |
| Linseed acid | 0.15 |

In this experiment 0.05% by weight of hydroquinone were added to prevent gelatin during reaction due to the maleic acid unsaturation.

EXAMPLE III

The following ingredients were employed in making a polyester-alkyd resin according to the method described in Example I.

| | |
|---|---|
| Hexachloroendomethylene phthalic anhydride | 0.95 |
| Maleic anhydride | 0.05 |
| Diethylene glycol | .95 |
| Propylene glycol | .05 |
| Tung acid | 0.15 |
| Linseed acid | 0.15 |

The above ingredients were reacted for one hour to produce the desired product.

The polyester-alkyd resins prepared in Examples I, II, and III were ground with inorganic pigments; e.g. titanium dioxide, in ordinary pulverizing equipment. Generally, it is preferred to thoroughly chill the polymer before it is introduced into a hammer mill. More coolant may be added to the mill as necessary.

Generally, it is desirable to surface treat the polyethylene surface prior to printing. This can be accomplished by any of the suitable means well-known in the art such as thorough oxidation of the surface by a known flame treatment.

Although the foregoing discussion of the present invention illustrates the particular advantages of the printing inks with respect to their good adhesion, flexibility and gloss characteristics as applied to selected surfaces and particularly to polyolefin surfaces, it will be understood that the printing inks of the present invention may also be utilized for printing on paper and similar surfaces.

I claim:
1. As an article of manufacture, a polyolefin substrate non-uniformly decorated with a heat fused printing ink in the form of an image selectively applied electrostatically through a stencil prior to fusion, said ink having improved flexibility and abrasion resistance and reduced adhesion to ink on contiguous substrates while being stored and consisting essentially of a polyester-alkyd resin prepared by the reaction of a difunctional, aliphatic hydroxy compound containing 2 to 6 carbon atoms and a dicarboxylic acid or anhydride in the presence of a drying oil acid.

2. The article of claim 1 wherein the hydroxy compound is a dihydric alcohol and the drying oil acid is a vegetable oil fatty acid.

3. The article of claim 2 wherein the resin is prepared from $1^n/2$ moles of dicarboxylic acid per mole of dihydric alcohol and $n$ mole of a drying oil acid where $n$ is about .025 to about .3.

4. The article of claim 3 wherein $n$ is about .1 to about .2.

References Cited

UNITED STATES PATENTS

| | | | |
|---|---|---|---|
| 2,907,674 | 10/1959 | Metcalfe et al. | 117—37 |
| 2,961,346 | 11/1960 | Dereich | 260—22 CQ |
| 3,003,892 | 10/1961 | Shannon | 117—47 |
| 3,091,546 | 5/1963 | Schmall | 117—161 K |
| 3,245,825 | 4/1966 | Fessler et al. | 117—38 |
| 3,273,498 | 9/1966 | Martin | 117—138.8 E |
| 3,279,940 | 10/1966 | Francis et al. | 117—138.8 E |
| 3,282,207 | 11/1966 | Plymale | 101—114 |
| 3,296,963 | 1/1967 | Rarey et al. | 101—114 |
| 3,332,898 | 7/1967 | Kloos | 260—22 D |
| 3,481,891 | 12/1969 | Boylan et al. | 106—27 |
| 3,521,557 | 7/1970 | Fisher et al. | 117—17.5 |

OTHER REFERENCES

Sayles, Dr. D. C., "Polyester Alkyd Resin Technology," Metal Finishing, February 1966, pp. 52–56 and 65.

Payne, H., "Alkyd Resins (Chap. 7)," Organic Coating Technology, vol. 1, John Wiley & Sons, Inc., 1954, pp. 269–277.

Martens, C. R., "4 Raw Materials," Alkyd Resins, Reinhold, N.Y., 1961, pp. 34–43.

WILLIAM D. MARTIN, Primary Examiner

R. M. SPEER, Assistant Examiner

U.S. Cl. X.R.

117—21, 38, 138.8 E, 161 K